(No Model.)

F. CAZIN.
CRUSHING ROLL.

No. 568,662. Patented Sept. 29, 1896.

Witnesses
Inventor
Franz Cazin
By Attorney

THE NORRIS PETERS CO., PHOTO-LITHO., WASHINGTON, D. C.

UNITED STATES PATENT OFFICE.

FRANZ CAZIN, OF DENVER, COLORADO, ASSIGNOR TO THE COLORADO IRON WORKS, OF SAME PLACE.

CRUSHING-ROLL.

SPECIFICATION forming part of Letters Patent No. 568,662, dated September 29, 1896.

Application filed December 4, 1895. Serial No. 571,047. (No model.)

*To all whom it may concern:*

Be it known that I, FRANZ CAZIN, a citizen of the United States, residing at Denver, in the county of Arapahoe and State of Colorado, have invented certain new and useful Improvements in Crushing-Rolls, of which the following is a specification, reference being had therein to the accompanying drawings.

My invention relates to ore-crushing rolls, and it is the object thereof to provide a pair of rolls longitudinally adjustable in relation to each other, thus serving to keep the faces of the same exactly opposite and thereby prevent the wearing of grates in the edges of the said rolls. To accomplish this, both rolls may be adjustable in the direction of their axes, or one of the rolls only may be adjustable in this direction.

The device is illustrated in the accompanying drawings, in which—

Figure 1:
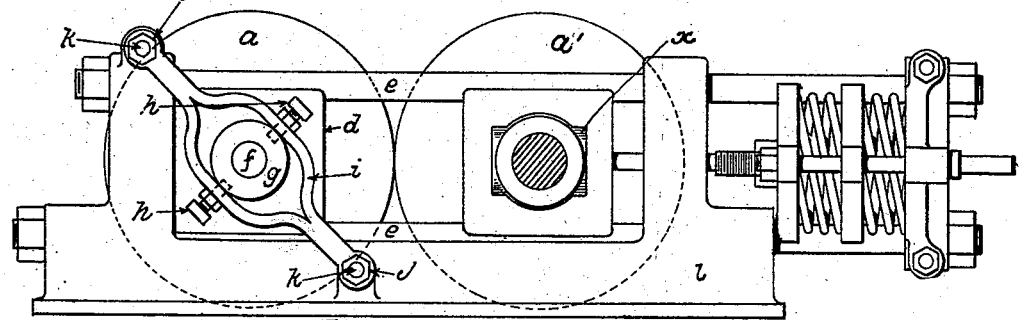
Figure 2:
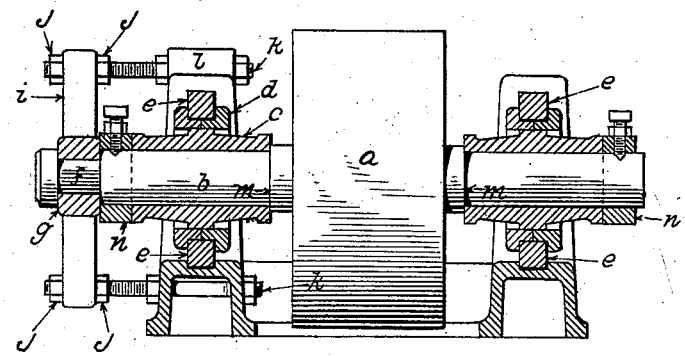
Figures 3, 4:
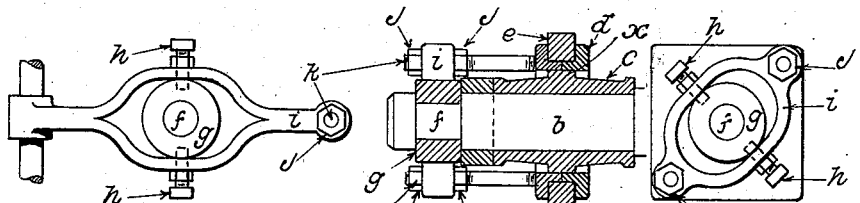
Figure 5:
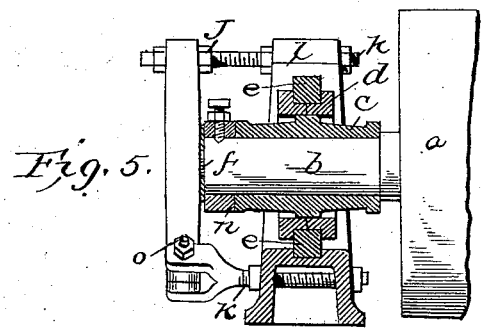

Figure 1 is a side elevation of the supporting-frame and rolls. Fig. 2 is a detail view of one of the rolls and journals thereof, parts being shown in section. Fig. 3 is a detail view. Fig. 4 is a modification in section and end elevation. Fig. 5 is a detail view, parts being shown in section.

In the accompanying drawings I have shown an ordinary form of supporting-frame $l$, in which a pair of rolls $a$ $a'$ are mounted, being held in contact by nests of springs A.

I have shown and described the present invention as applied to only one roll, but it will be understood the invention may be applied to both rolls without departing from the spirit of the invention.

In Fig. 2 is shown in detail the roll $a$, carried by the shaft $b$, journaled in the trunnion-boxes $c$, provided with a flange $x$, which fits within a corresponding opening in the frame $d$. This trunnion-box is adjustably supported in the trunnion-box frames $d$, having sliding connection therewith, the frame $d$ being longitudinally movable in the main frame $l$ and guided therein by the bars $e$, entering recesses in the top and bottom of said frames $d$.

One end of the shaft $b$ is recessed to form a journal $f$, and a collar $g$ fits this annular recess, as shown in Fig. 2. A diagonally-extending bar $i$ embraces by its central loop portion the collar $g$, to which it is connected by binding-screws $h$. The bar $i$ is provided at each end with an eye fitting over the ends of threaded rods $k$ and held thereto adjustably by nuts $j$. The rods $k$ are rigidly secured at one end to the frame $l$, as shown in Fig. 2, or they may be secured to the box-frame itself, as shown in the modification Fig. 4.

The adjustment of the ends of the bar $i$ moves the journal $b$ and the roll carried thereby through the connections described.

Rings N are fixed to the journals $b$ by suitable binding-screws, and the side edges of these rings abut the edges of the journal-boxes, the opposite edges of said boxes bearing against shoulders $m$, formed by the enlarged central parts of the hub of the roll. By this arrangement the journal is prevented from moving independently of the boxes, but carries said boxes with it as it is adjusted, thus causing said boxes to slide in the box-frames.

The cross-bar $i$, as shown in Figs. 3 and 5, may be pivotally secured at one end between the bifurcated ends of the lower rod $k$ by the bolt $o$.

What I claim is—

1. In combination, the main frame, the trunnion-box frame movable longitudinally thereof, the trunnion-box movable transversely of said box-frame, and the roll journaled therein, substantially as described.

2. In combination the main frame, the rollers, the shaft having a shoulder $m$, the trunnion-box frame, the trunnion-box sliding freely therein in the line of the axis of said shaft, one end of said box abutting the shoulder $m$, and the collar $n$ fixed to said shaft and abutting the opposite end of said trunnion-box and means for longitudinally adjusting and securing in adjustment, said shaft and trunnion-box.

3. In combination, the roll, the main frame, the trunnion-box frame, the trunnion-box movable freely in said box-frame in the line of the longitudinal axis of said frame, the roll-shaft, the threaded rods and the bar mounted thereon, and the nuts, substantially as described.

In testimony whereof I affix my signature in presence of two witnesses.

FRANZ CAZIN.

Witnesses:
E. E. GOODALE,
W. C. MACDONALD.